ABSTRACT OF THE DISCLOSURE

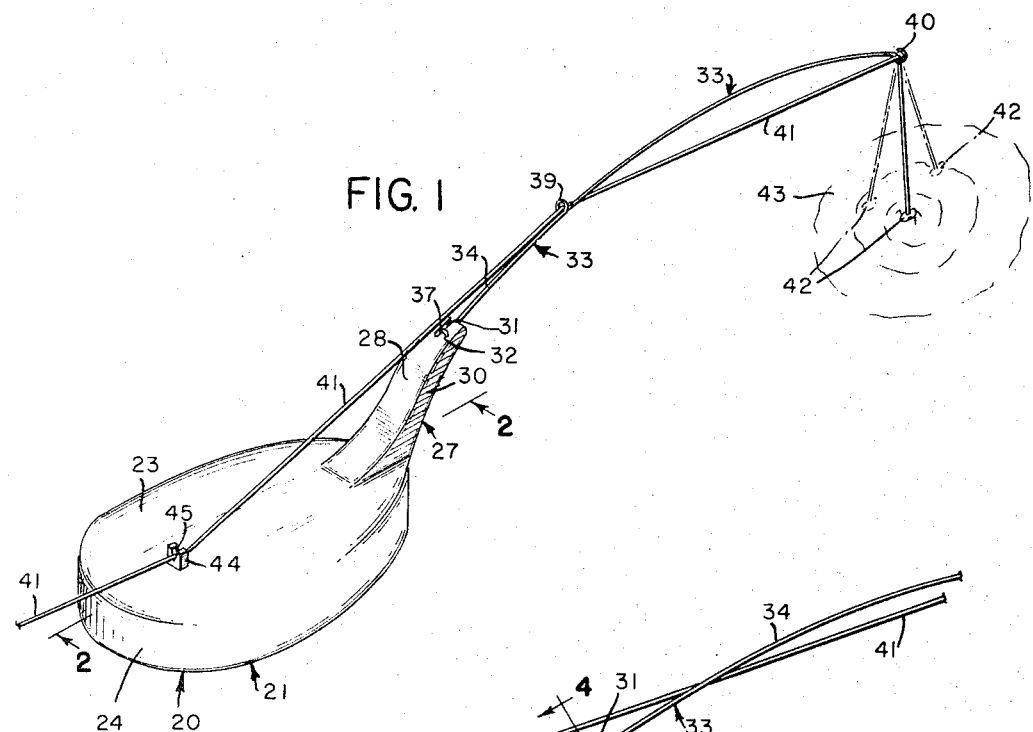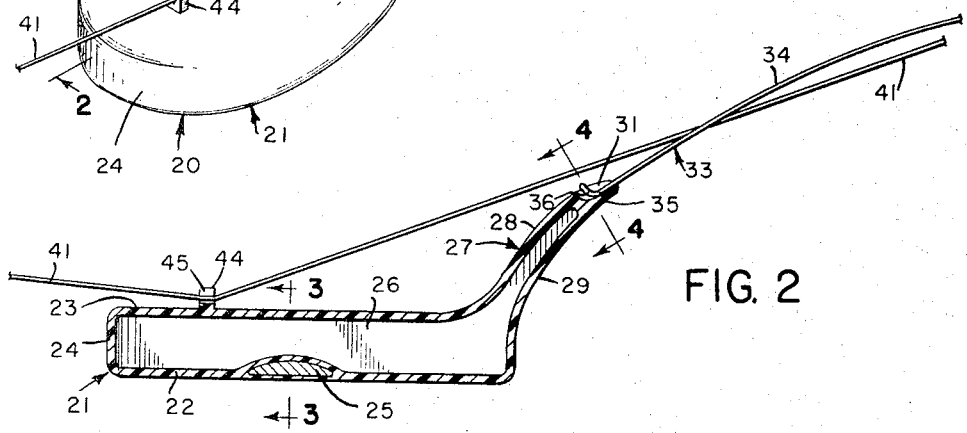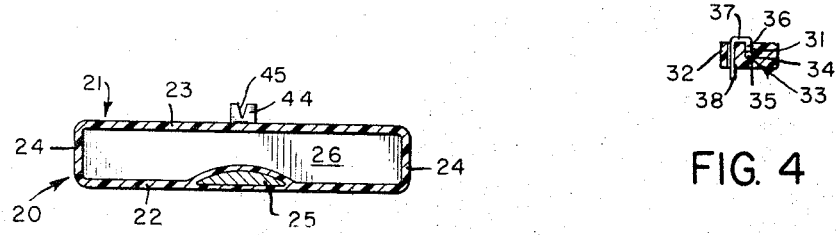
Oct. 17, 1967  W. D. CORNWELL  3,346,987
SUSPENDED BAIT LURE
Filed March 19, 1965
INVENTOR
WOODROW D. CORNWELL
BY
ATTORNEY 3,346,987
SUSPENDED BAIT LURE
Woodrow D. Cornwell, Box 54, Middletown, Va. 22645
Filed Mar. 19, 1965, Ser. No. 441,039
1 Claim. (Cl. 43—43.15)

A fishing float having resilient line holding means thereon whereby a fishing line carrying a lure is attached to said resilient means a predetermined distance from said lure and gives said lure a constant movement in the water to attract fish.

---

The primary object of this invention is to provide a suspended bait lure that includes a float or buoyant body member which is adapted to have a leg or fine steel spring rod connected thereto for supporting a suitable lure or bait therefrom.

A further object is to provide a suspended bait lure which is constructed so that the lure will have a tendency to skip and dance over water or in the water whereby the fish will be attracted thereto in a highly efficient and desirable manner.

Still another object is to provide such a suspended bait lure that is economical to manufacture and efficient in use and which is rugged in structure and foolproof in operation.

These and other objects of the invention will become apparent from a reading of the following specification and claims, together with the accompanying drawing, wherein like parts are referred to and indicated by like reference characters and wherein:

FIG. 1 is a perspective view illustrating the suspended bait lure of the present invention.

FIG. 2 is a sectional view taken on the line 2—2 of FIG. 1.

FIG. 3 is a sectional view taken on the line 3—3 of FIG. 2.

FIG. 4 is a sectional view taken on the line 4—4 of FIG. 2.

Referring in detail to the drawings, the numeral 20 indicates the suspended bait lure of the present invention which includes a hollow body member or float that is indicated by the numeral 21, FIG. 2, and the body member 21 includes a flat bottom 22 as well as a top wall portion 23. The body member 21 further includes a generally vertically disposed side wall portion 24. The numeral 25 indicates a weight that is suitably mounted or embedded in the bottom wall 22 of the member 21. As shown in the drawings, the body member 21 is adapted to have a hollow interior as indicated by the numeral 26, and the member 21 is adapted to be made of a suitable material such as a suitable plastic of one-piece molded construction.

The numeral 27 indicates an upstanding neck portion on an end of the member 21, and the neck portion 27 extends upwardly and outwardly from an end of the member 21, as shown in FIG. 2 for example. The neck portion 27 is adapted to include generally curved top and bottom surfaces 28 and 29 as well as spaced apart side surfaces 30, FIG. 1. The neck portion 27 is constructed so that its outer upper end is somewhat offset or spaced away from the member 21 for a purpose to be later described.

The numeral 33 indicates a supporting means which is in the nature of a fine spring-like wire that includes a main section 34 as well as a section or portion 35 that is arranged in engagement with a slot 31 in the upper outer end of the neck portion 27. The portion 35 of the wire 33 terminates in an upstanding portion 36, FIG. 4, and the portion 36 is adapted to terminate or merge into a transverse portion 37, and the portion 37 terminates in a downwardly extending portion or section of the wire as indicated by the numeral 38, and the downwardly extending portion 38 is adapted to extend or project through a hole or opening 32 that is formed in the neck portion 27. This construction provides a means for anchoring the wire 33 in place in the desired manner as shown in the drawings. The wire 33 includes a looped portion 39 intermediate the ends thereof as well as a looped portion 40 at its outer end, FIG. 1, and these looped portions 39 and 40 provide or define eyelets for the projection therethrough of a portion of a fishing line 41. The end of the fishing line 41 shown in the left of FIG. 1 is adapted to be connected to a conventional fishing reel in the usual manner, while the other end of the line 41 is adapted to have a hook or lure 42 of a suitable type connected thereto, and in FIG. 1 the numeral 43 indicates a portion of the body of water being fished.

As shown in the drawings, there is provided a projection or lug 44 on the top portion 23 of the body member 21, and the projection 44 is adapted to be suitably affixed to or formed integral with the member 21. The projection 44 is provided with a tapered or V-shaped recess or slots 45 which has a portion of the fishing line 41 extended therethrough, FIGS. 1 and 2.

From the foregoing, it will be seen that there has been provided a new fishing lure which is in the nature of a suspended bait lure, and with the parts arranged as shown in the drawings, it will be seen that the fishing line 41 is adapted to be arranged in engagement with the tapered slot 45 of the projection 44, and the line 41 is adapted to be connected to the fishing reel in the usual manner. The line 41 extends through the eyelets or looped portions 39 and 40 of the wire 33, and the lure or hook 42 is suspended or connected to the end of the line 41 as shown in FIG. 1. The member 21 is adapted to be made of integral formation of a suitable material such as a suitable plastic material and wherein the interior is hollow as at 26, and the member 21 is constructed so that it will float on the water. The weight 25 is provided for helping to stabilize the member 21. The neck 27 is arranged and constructed as an integral part of the member 21 so that the wire 33 will be supported in the proper manner. The wire 33 has the portion thereof as indicated by the numeral 35 arranged in engagement with the slot 31 in the upper end of the neck 27, and the portion 38 of the wire is adapted to extend down through the aperture or opening 32 in the neck 27 so that the wire 33 will be properly anchored in place.

The parts can be made of any suitable material and in different shapes or sizes as desired or required.

The member 21 may be constructed so that it has a fanciful configuration, and operatively connected to the member 21 is the wire 33 which may be a piece of spring steel wire about $3/32$ of an inch in diameter and about 15 to 18 inches long and this wire is very springy. Lures or bait such as flies, spiders, grasshoppers, bugs and the like are adapted to be provided as indicated by the numeral 42 and it will be therefore seen that the least amout of movement will start the spring steel wire 33 jumping and moving so as to cause the hook or lure 42 to dance around on top and over the top of the water and this movement makes the lure 42 look very much alive and realistic.

With the suspended bait lure of the present invention a fisherman can cast the lightest lure or bait anywhere on the water and have the lure moving all the time just like live bait, and in addition live bait can also be used with the present invention. The present invention can be cast out with any type of reel. The float or member 21 is adapted to have the small weight 25 on its bottom to keep it falling and setting right on the water such as the water 43.

In addition, with the lure of the present invention, the user can cast upstream and let the lure float down under a low hanging tree or the like where a lot of fish stay and the lure or bait will be moving and acting alive at all times. Also, the wire can be bent down so as to permit the bait or lure to lay on the water all the time still moving around, or else the wire can be bent up so as to let the bait dangle over the water and just skipping the water on top thereof. If the water is perfectly still, the fishing rod or pole can be moved a little bit and the bait or lure will start dancing all around. Thus, there will be a dancing or moving action of the spring wire and lure so that the action will take place in the desired manner.

As previously stated, the wire may be arranged so that a portion thereof is up over the water such as is illustrated in FIG. 1 and the wire may be arranged so that it is above the water a suitable distance such as from 10 to 12 inches with the bait or lure hanging down, and the lure can be arranged so it hangs down into, or on top of, or over the top of the water. With the present invention there will be a moving or dancing and skipping action of the bait and wire, and the member 21 is also adapted to move during use of the lure. Due to the inherent resiliency of the spring wire 33, the spring wire will dance or move sideways or up and down and thus the bait will appear alive in the desired manner. Any suitable type of bait or lure 42 can be arranged on a hook on the end of line 41.

The lure of the present invention will also work with a stiff leg hanging off of the float or member 21 or sticking straight up from the member and this construction permits the bait to get its movement from the float alone.

It will therefore be seen that there has been provided a new fishing lure which consists of a small member or float 21 that may be made hollow or else it may be made of a suitable lightweight floating material with a small weight in its bottom so that it will land upright at all times.

Some of the advantages of the suspended bait lure of the present invention are as follows. The user can cast the smallest fly or bait anywhere a person can cast any other kind of plug or bait, and when the lure hits the water, the bait such as the flies, bugs, grasshoppers, crickets or wet flies and the like start to skip and dance around over and on top of the water making the bait move and resemble live bait. This movement will keep up all the time that the bait is in the water because the least little bit of movement of the water will cause the float to move and this causes the spring steel wire to bounce around just the proper amount. The lure can be cast upstream and the action will start at once and this permits the user to fish 360° around him. Also, the user can cast upstream and the lure can be permitted to drift under trees that touch water whereby fish can be picked off that hang out in such locations without hooking up. On ponds where the water is still, it is only necessary to barely tug on the line and the bait will start moving and will continue to move for a long period of time. Also the user can get upstream from a trout hole or the like so as to permit the lure to drift in with this movement and trout are adapted to be caught. Also live bait can be used with the lure of the present invention.

The line 41 extends all the way from the rod or reel to the hook so that the fish when caught, will not pull on the wire or float and also, the hook can be moved up or down from the water by pulling the line 41 through to the desired location. The wire 33 is adapted to be bent to the desired configuration and the wire is adapted to be hooked through the slot 31 and the end of the wire is adapted to be arranged in engagement with the hole 32 in the end of the plastic float and with this construction the wire can be taken out or unhooked so that the lure can be put away when desired. Also, the tapered recess or slot 45 is such that the line 41 will be held fast in the tapered slot 45. The lure 20 is of all molded plastic construction. It will therefore be seen that with the present invention there has been provided a unique and efficient suspended bait lure.

Minor changes in shape, size and rearrangement of details coming within the field of invention claimed may be resorted to in actual practice, if desired.

What is claimed is:

A suspended bait lure comprising a hollow body member of one-piece molded plastic construction having a flat bottom wall, said body member including a side wall portion and a top wall, a weight mounted in the bottom wall, said body member including an upstanding neck portion that extends upwardly and outwardly from an end of the body member and wherein the upper outer end portion of the neck portion is offset outwardly and away from the body member, there being a slot in the upper outer end of said neck portion, said neck portion having an opening therein adjacent said slot, a fine springy wire having a portion thereof extending through said slot and said wire having a portion extending through the opening in the neck portion, said wire having looped portions providing eyelets, an upwardly extending projection on the top of said body member and said projection having a tapered slot therein, and a fishing line extending through said tapered slot and also extending through said eyelets, and said fishing line adapted to be connected to a fishing reel, and said fishing line adapted to have a hook connected thereto.

References Cited

UNITED STATES PATENTS

| | | | |
|---|---|---|---|
| 2,456,254 | 12/1948 | Caruso | 43—43.15 |
| 2,575,852 | 11/1951 | Trowbridge | 43—16 |
| 2,577,143 | 12/1951 | Midland | 43—43.15 X |
| 2,975,541 | 3/1961 | Birrell | 43—43.15 |

FOREIGN PATENTS

| | | |
|---|---|---|
| 873,084 | 3/1942 | France. |
| 278,853 | 2/1952 | Switzerland. |

SAMUEL KOREN, *Primary Examiner.*

WARNER H. CAMP, *Examiner.*